(12) United States Patent
Deane et al.

(10) Patent No.: US 7,585,351 B2
(45) Date of Patent: Sep. 8, 2009

(54) SYSTEMS AND METHODS OF MONITORING AND CONTROLLING THE PERFORMANCE OF A GAS FRACTIONALIZATION APPARATUS

(75) Inventors: Geoffrey Frank Deane, Goleta, CA (US); Jeffrey Jenneve, Santa Barbara, CA (US); Charles Morison, Goleta, CA (US); Brenton Alan Taylor, Kenwood, CA (US)

(73) Assignee: Inogen, Inc., Goleta, CA (US)

( * ) Notice: Subject to any disclaimer, the term of this patent is extended or adjusted under 35 U.S.C. 154(b) by 606 days.

(21) Appl. No.: 11/362,443

(22) Filed: Feb. 23, 2006

(65) Prior Publication Data

US 2006/0230924 A1 Oct. 19, 2006

Related U.S. Application Data

(60) Provisional application No. 60/655,509, filed on Feb. 23, 2005.

(51) Int. Cl.
*B01D 53/02* (2006.01)
(52) U.S. Cl. ............... 95/19; 95/22; 95/96; 95/138; 96/114; 96/130
(58) Field of Classification Search ............... 95/19, 95/22, 96, 138; 96/113, 114, 130; 128/205.21, 128/205.24
See application file for complete search history.

(56) References Cited

U.S. PATENT DOCUMENTS

| 5,495,848 | A | 3/1996 | Aylsworth et al. |
| 6,273,936 | B1 | 8/2001 | Barry et al. |
| 6,395,065 | B1 | 5/2002 | Murdoch et al. |
| 6,497,755 | B2 * | 12/2002 | Murdoch et al. ............... 96/110 |
| 7,445,663 | B1 * | 11/2008 | Hunter et al. ............... 95/96 |

FOREIGN PATENT DOCUMENTS

WO   WO 02/11861 A1   2/2002

OTHER PUBLICATIONS

International Search Report for PCT/US2006/006392, filed Feb. 23, 2006.

* cited by examiner

*Primary Examiner*—Robert A Hopkins
(74) *Attorney, Agent, or Firm*—Knobbe, Martens, Olson & Bear LLP

(57) ABSTRACT

A gas fractionalization apparatus and methods for providing oxygen rich air to patients are disclosed. The apparatus comprises a variable output compressor, a PSA unit, a control system, and one or more pressure sensing devices. Pressure of the oxygen rich gas is maintained within a selected window by adjusting the output of the compressor in response to changes in the pressure of the oxygen rich gas. Methods of feedback control are further provided for calibration of the compressor under factory and in-service conditions, as well as under high-altitude conditions. Methods for providing diagnostic estimates and alarms of time to service are further provided.

26 Claims, 8 Drawing Sheets

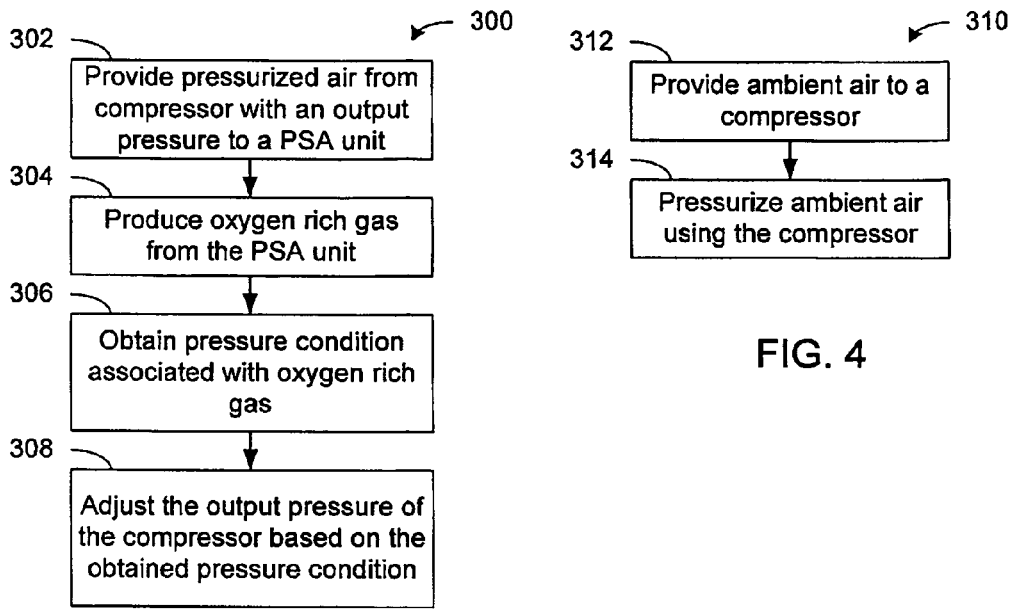
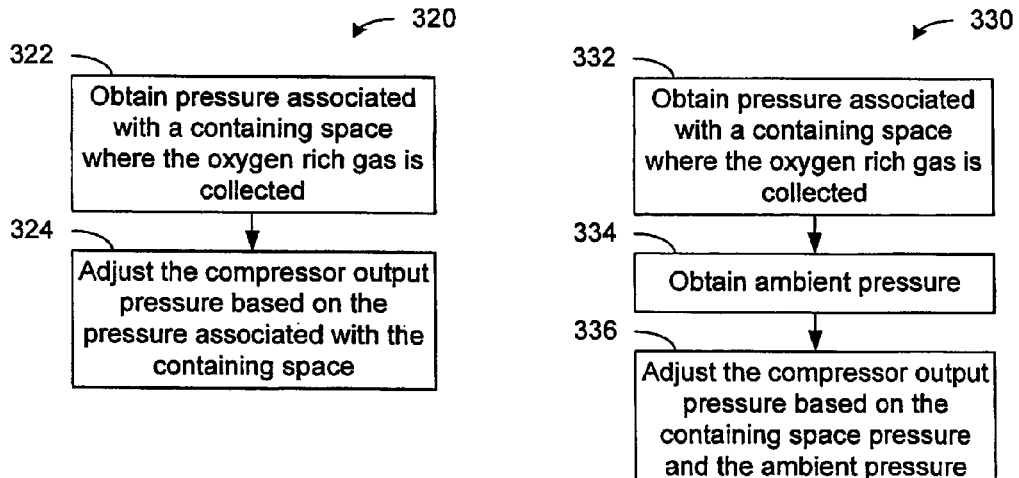

SYSTEMS AND METHODS OF MONITORING AND CONTROLLING THE PERFORMANCE OF A GAS FRACTIONALIZATION APPARATUS

CROSS-REFERENCE TO RELATED APPLICATIONS

This application claims the benefit of priority under 35 U.S.C. §119(e) of U.S. Provisional Application No. 60/655,509 filed on Feb. 23, 2005 and entitled COMPRESSOR OUTPUT GAS FLOW CONTROL FOR A GAS CONCENTRATOR, the entirety of which is incorporated herein by reference.

BACKGROUND OF THE INVENTION

1. Field of the Invention

This invention relates generally to gas fractionalization systems and, in particular, to systems and methods for monitoring and controlling the gas fractionalization system to provide consistency and reliability in system performance over time.

2. Description of the Related Art

The application of oxygen concentrators for therapeutic use is known, and many variants of such devices exist. A particularly useful class of oxygen concentrators is designed to be portable, allowing users to move about and to travel for extended periods of time without the need to carry a supply of stored oxygen. Most of these portable concentrators produce an oxygen-rich gas by feeding compressed air through a pressure swing adsorption (PSA) system which selectively removes nitrogen and other components in the air so as to produce a pressurized, oxygen-rich product gas.

Generally, the design of such portable concentrators should be small, lightweight and quiet to be effective. One of the elements to achieve these design goals is to optimize the operation of the compressor, which is typically one of the main consumers of power and producers of noise in a concentrator. Compressors capable of variable output have been used to vary the compressor output air flow to match the required product gas output so that power consumption and noise do not exceed what is required to deliver the desired amount of product gas. Such compressors include fixed displacement volume with variable speed control, fixed speed with variable displacement volume control, or combined variable speed/variable displacement designs.

However, it is often difficult to modulate the compressor speed or displacement in a manner that is accurate and reproducible over time to meet the requirements of precise product gas flow rate necessary for therapeutic use. For example, the inventors have found that it is often impractical to obtain large numbers of speed controlled compressors in a desired size/capacity range that all fall within a narrow range of capacity versus flow required for concentrator applications. Consequently, a significant fraction of a lot of compressors often ends up being rejected at the time the concentrators are built and tested. While compressors having tighter tolerances are available, the cost of such compressors is often very high which in turn increases the initial manufacturing cost of portable concentrators. Moreover, the flow performance of compressors with respect to fixed speed or displacement typically change over time due to break-in and wear, which in turn could cause the concentrator to develop out of specification performance as to accuracy of delivery rate.

From the foregoing, it will be appreciated that there is a need for an apparatus and method for effectively providing supplemental oxygen to patients in a consistent and reliable manner. To this end, there is a particular need for oxygen concentrators that are relatively quiet, energy efficient and cost effective, while providing accurate and reliable system performance over time.

SUMMARY OF THE INVENTION

The foregoing needs can be addressed by various embodiments of systems and methods relating to a gas fractionalization apparatus that can be configured to provide oxygen rich air to patients. The apparatus can include a variable output compressor, a PSA (pressure swing absorption) unit, a feedback control system, and one or more pressure sensing devices. The pressure of the product gas, such as oxygen rich gas, can be maintained within a selected range by adjusting the output of the compressor in response to changes in the pressure of the product gas. In various embodiments, feedback control, calibration, servicing alerts, and operations in high-altitude conditions are also possible.

One embodiment of the present invention relates to a method of producing an oxygen rich gas. The method includes providing ambient air to a compressor. The method further includes pressuring the ambient air in the compressor. The method further includes delivering the pressurized air from the compressor to a PSA unit. The method further includes processing the pressurized air in the PSA unit in accordance with a PSA cycle so as to produce an oxygen rich gas. In one embodiment, the method further includes delivering the oxygen rich gas to a containing space. The method further includes measuring the pressure of the oxygen rich gas. The method further includes maintaining the pressure of the oxygen rich gas at one or more pre-selected levels by adjusting an output pressure of the compressor.

In one embodiment, the output pressure of the compressor is adjusted based on the measured pressure of the oxygen rich gas. In one embodiment, the measured pressure of the oxygen rich gas includes an average of a plurality of sampled pressure values obtained during a selected time period. In one embodiment, the pressure of the oxygen rich gas is generally in phase with the PSA cycle. The sampled pressure values correspond to peak values of the cyclic profile of oxygen rich gas pressure.

In one embodiment, the selected time period includes N sampled pressure values, such that averaging of the N values reduces the likelihood that the adjustment of the output pressure will be triggered by spurious fluctuations of individual sampled pressure values. In one embodiment, the N sampled pressure values correspond to N breathing cycles. In one embodiment, the selected time period begins anew when an error condition occurs during the current time period.

In one embodiment, the output of the compressor is adjusted by adjusting a speed of the compressor. In one embodiment, the output of the compressor is adjusted by adjusting a displacement of the compressor. In one embodiment, the output of the compressor is adjusted by a combination of adjustments to pumping speed and displacement of the compressor.

In one embodiment, the method further includes measuring an ambient pressure about the containing space so as to facilitate adjustment of the output pressure of the compressor when the ambient pressure changes. In one embodiment, the output pressure of the compressor is adjusted based on a value representative of a combination of the pressure of the oxygen rich gas and the ambient pressure. In one embodiment, the value includes a compression ratio that is expressed as $K=(P_{ambient}+P_{accumulator})/P_{ambient}$, where $P_{ambient}$ represents the ambient pressure and $P_{accumulator}$ represents the pressure of the oxygen rich gas. In one embodiment, the method further includes determining a target value of the oxygen rich gas, P*, based on the value of the compression ratio, such that the output pressure of the compressor is adjusted to provide pressure of the oxygen rich gas at or near the target value.

In one embodiment, maintaining the pressure of the product gas at the one or more pre-selected levels includes maintaining the pressure within a range of pressure values having a nominal value. In one embodiment, the range of pressure values is determined by measuring and logging values of the pressure of the oxygen rich gas during a selected period, so that the range includes a full range of the logged values. In one embodiment, the nominal value includes an average of the full range of the logged values. In one embodiment, the range further includes upper and lower threshold values, so that a pressure value outside of such threshold values triggers the adjustment of the output pressure of the compressor. In one embodiment, the upper and lower threshold values are determined by deviations from the nominal value by a fraction of the full range. In one embodiment, the fraction includes approximately two percent. Other fraction values are possible. In one embodiment, the selected period includes an initial period of the operation of the compressor.

In one embodiment, the method further includes monitoring an operating parameter of the compressor that is used for adjusting the output pressure of the compressor. In one embodiment, the method further includes determining whether the operating parameter can be adjusted by an amount greater than a capacity margin associated with the operating parameter of the compressor. In one embodiment, the operating parameter includes a speed of a pump used in the compressor. In one embodiment, a service indicator is triggered if the amount of adjustment exceeds the capacity margin.

Another embodiment of the present disclosure relates to a gas fractionalization apparatus that includes a compressor which compresses a gas, such as air, to provide an output gas. The apparatus further includes a PSA unit which receives and processes the output gas from the compressor to produce a purified gas. The apparatus further includes a sensing device which measures the pressure of the purified gas. The apparatus further includes a feedback mechanism which controls the pressure of the purified gas by varying one or more parameters of the compressor in response to changes in the pressure of the purified gas.

In one embodiment, the product gas includes an oxygen rich gas. In one embodiment, the product gas pressure is measured by the sensing device within the storage device.

In one embodiment, the feedback mechanism includes a programmable controller and a pulse width modulation circuit in closed loop communication with the compressor. In one embodiment, the apparatus further includes a second sensing device which measures the pressure of ambient air. In one embodiment, the feedback mechanism adjusts the output pressure of the compressor to maintain a pre-determined compression ratio.

Yet another embodiment of the present disclosure relates to a gas fractionalization apparatus that includes a compressor which compresses a gas, such as air, to provide a pressurized gas. The apparatus further includes a means for processing the pressurized gas to produce a purified gas. The apparatus further includes a means for containing the purified gas. The apparatus further includes a means for controlling the pressure of the purified gas in the container means. The control means includes a means for sensing the pressure of the purified gas and a means for adjusting one or more parameters of the compressor in response to changes in the pressure of the purified gas so as to maintain the pressure at one or more pre-selected levels.

In one embodiment, the compressor parameters include speed and displacement. In one embodiment, the pressurized gas processing means includes a PSA system. In one embodiment, the sensing means measures the pressure of the purified gas within the storage means. In one embodiment, adjustment means includes a programmable controller and a pulse width modulation circuit in closed loop communication with the compressor. In one embodiment, the control means further includes a means for sensing the pressure of ambient air and a means for adjusting one or more parameters of the compressor in response to changes in the pressure of the purified gas so as to maintain a pre-determined compression ratio.

BRIEF DESCRIPTION OF THE DRAWINGS

FIG. 3 shows one embodiment of a process configured to allow adjustment of compressor output pressure based on a pressure condition of the product gas;

FIG. 4 shows one embodiment of a process configured to provide compressed air to the PSA unit;

FIG. 5A shows one embodiment of a process configured to determine a pressure value associated with the oxygen rich gas in a contained space of the gas fractionalization apparatus, and adjust the compressor output accordingly;

FIG. 5B shows one embodiment of a process configured to adjust the compressor output pressure based on the pressure of the oxygen rich gas in the contained space and the ambient pressure outside of the contained space;

DETAILED DESCRIPTION OF THE PREFERRED EMBODIMENT

Figure 1:
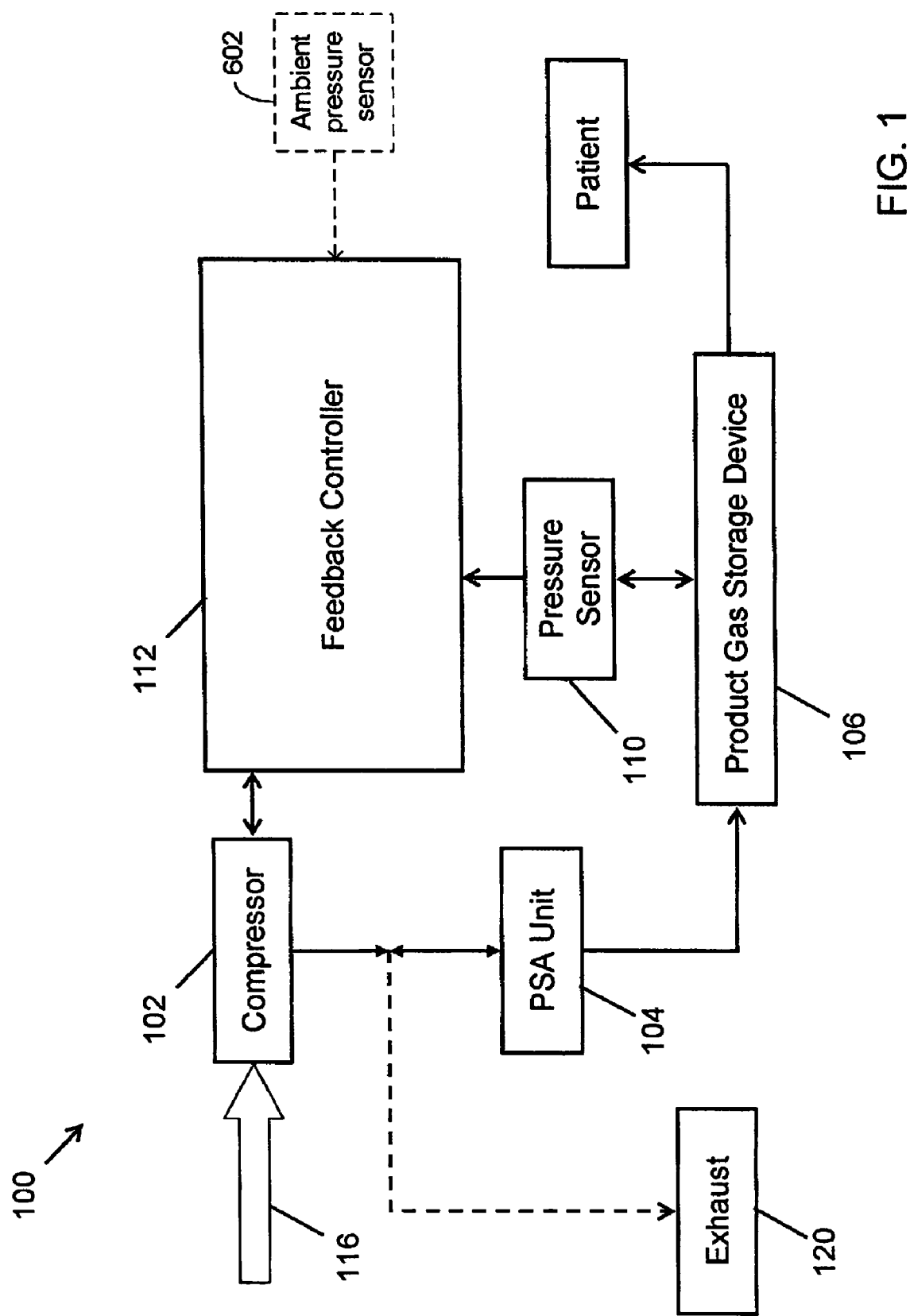
FIG. 1 is a block diagram of a gas fractionalization apparatus of one preferred embodiment of the present invention.

FIG. 1 schematically illustrates a gas fractionalization system 100 of one preferred embodiment of the present invention. As shown in FIG. 1, the system 100 generally comprises a compressor 102 through which ambient air is drawn into the system 100 and pressurized, a PSA unit 104 which receives and processes the pressurized gas to produce a product gas having a higher oxygen content than the ambient air, a storage device 106 for storing the product gas, a sensing device 110 which measures the pressure of the product gas, and a feedback mechanism 112 which controls the pressure of the product gas by varying one or more parameters of the compressor in response to changes in the pressure of the product gas in a manner to be described in greater detail below.

As illustrated in FIG. 1, the compressor 102 draws ambient air into the system 100 through an air intake 116 and compresses the air for use by the PSA unit 104. In one embodiment, the compressor 102 is a variable output compressor, capable of varying its speed and/or displacement, so as to be capable of operating with a fixed displacement and variable speed, a variable displacement and fixed speed, or a variable displacement and variable speed. In another embodiment, the compressor 102 is a non-reciprocating compressor such as that described in U.S. Pat. No. 5,759,020, which is hereby incorporated by reference in its entirety. In yet another embodiment, the compressor 102 is a linear compressor such as that described in U.S. Pat. No. 5,525,845, which is hereby incorporated by reference in its entirety. In a preferred implementation, the compressor 102 operates in a fixed displacement and variable speed mode. In further preferred implementations, the compressor may utilize brushed or brushless D.C. motors.

The PSA unit 104 accepts the pressurized gas from the compressor 102 to produce oxygen enriched product gas in accordance with one or more PSA cycles. The general operating principles of PSA cycles are known and commonly used to selectively remove one or more components in various gas fractionalization devices such as oxygen concentrators. A typical PSA cycle entails cycling a valve system connected to at least two adsorbent beds such that a pressurized feed gas is sequentially directed to each adsorbent bed for selective adsorption of a component of the gas, while waste gas from previous cycles is simultaneously purged from the adsorbent bed(s) that are not performing the adsorption through an exhaust 120. Product gas with a higher concentration of the un-adsorbed components(s) is collected for use. Additional background information on PSA technology is described in U.S. Pat. No. 5,226,933, which is hereby incorporated by reference in its entirety.

Additional details on gas fractionalization systems are also described in a U.S. Patent Application Publication No. 2005/0072426, which is hereby incorporated by reference in its entirety.

The product gas produced by the PSA unit 104 is directed to the storage device 106. The storage device 106 may comprise a storage vessel, an accumulator, a tube filled with a powder with a high area to volume ratio, or other enclosures configured to hold a volume of pressurized gas. The inventors have found that the pressure of the product gas, in one sense, is indicative of the system performance, for example, the ability to deliver a prescribed amount of product gas to the patient consistently and reliably. The inventors have also found that fluctuations in the pressure of the product gas is often indicative of system drifts which could be due to wear and tear of the various parts such as seals and valves. For example, leakage in the system or other effects can either reduce or increase the oxygen rich gas pressure, even if the compressor is outputting at a given level. As will be described in greater detail below, certain preferred embodiments of the present invention utilize the product gas pressure as an indicator to monitor and adjust the system to compensate for system performance drifts that may occur over time.

In one embodiment, in response to changes in the product gas pressure, one or more of the compressor parameters may be adjusted to compensate and return the product gas pressure back to a pre-selected nominal value or range of values. These compressor adjustments may take place until the limits of compressor adjustment are reached, as for example, in the case where the speed of the compressor cannot be increased further. Generally, a small amount of compressor adjustment indicates a healthy system which does not require maintenance, while a large amount of compressor adjustment indicates a system in poor health which requires maintenance. Thus, the product gas pressure can be used to monitor and control the system performance over time, as described in greater detail below.

As shown in FIG. 1, the sensing device 110 can be set up to measure the pressure of product gas inside the storage device 100 and communicate the measured pressure to the feedback mechanism. In one embodiment, the sensing device 110 comprises a pressure sensor to measure the pressure of the product gas. As discussed in greater detail below, the pressure measurements may be taken at predetermined points. In a preferred embodiment, the sensing device 110 is placed in the storage device 106. Embodiments of the disclosed invention may also place the sensing device 110 at alternative locations within the apparatus 100, such as at the outlet of the compressor 102 or inside PSA columns.

As further shown in FIG. 1, the system 100 may optionally include an ambient pressure sensor 602 that is configured to measure pressure external to the product gas storage device 106. As described below in greater detail, the ambient pressure sensor 602 can be used in conjunction with the pressure sensor 110 to allow control of the compressor 102 based on a parameter involving the ambient pressure.

Figure 2:
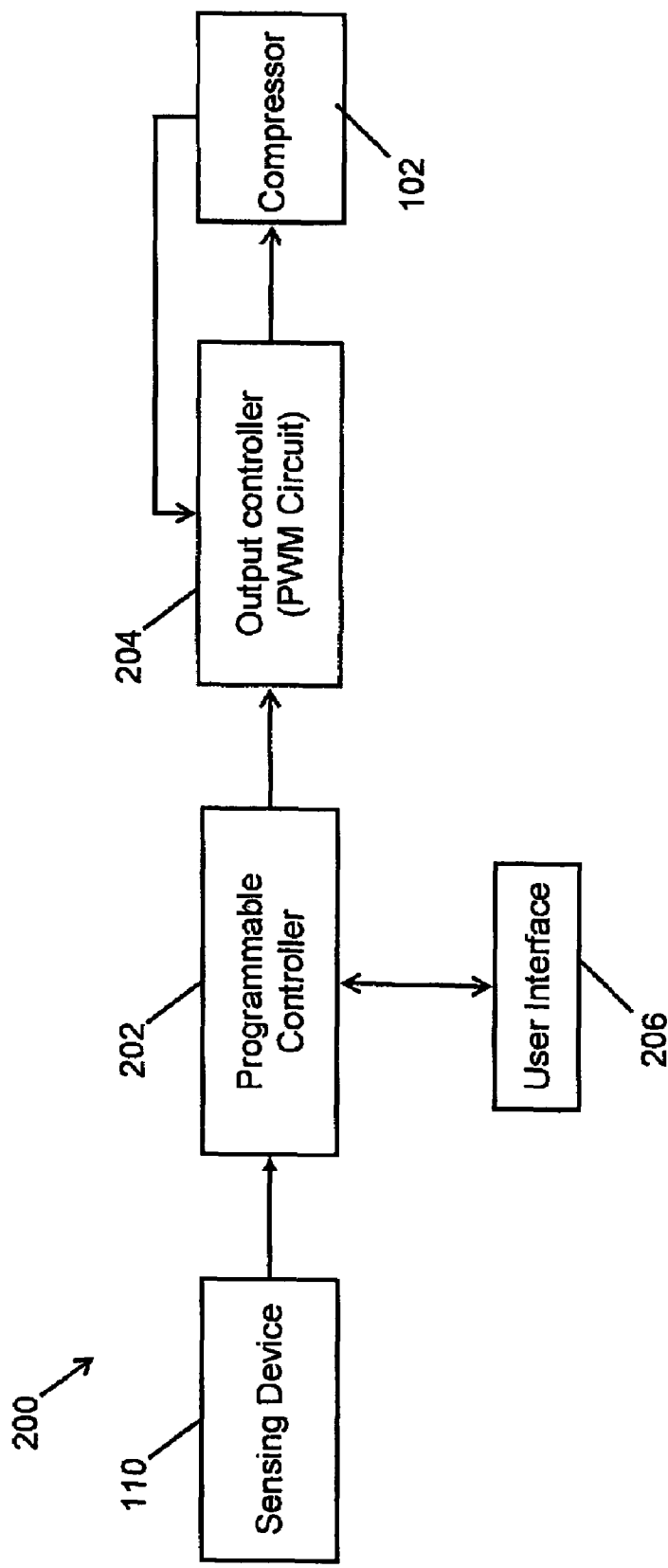
FIG. 2 shows a block diagram of one embodiment of a system configured to control an operation of a compressor based on an input such as a pressure of an oxygen rich gas in the gas fractionalization apparatus.

FIG. 2 illustrates one embodiment of the feedback mechanism 112 shown in FIG. 1. As shown in FIG. 2, the feedback mechanism 112 comprises a programmable controller 202, an output controller 204, and a user/data interface 206. The output controller 204, in a preferred embodiment, comprises a pulse width modulation (PWM) motor control. The general operating principles of PWM are known and commonly used to provide pulse width modulated output signal for motor control based on an analog input. Additional background information on PWM motor control is described in U.S. Pat. No. 5,747,806, which is hereby incorporated by reference.

In one embodiment, the programmable controller 202 works in conjunction with the output controller 204 to adjust one or more parameters of the compressor affecting the compressor output pressure in response to changes in pressure of the product gas. In a preferred implementation, the programmable controller 202 is placed in communication with the sensing device 110, the user/data interface 206, and the output controller 204. The programmable controller 202 receives the product gas pressure measured by the sensing device 110 and compares this pressure to a pre-determined pressure range. In one embodiment, the pre-determined pressure range is a user-defined parameter which is input through the user data interface 206. The programmable controller 202 communicates command signals, instructing the output controller 204 to adjust one or more of the compressor parameters in order to keep the measured product gas pressure within the pre-determined range. In one embodiment, the output controller 204 subsequently adjusts one or more of the compressor parameters in a closed-loop mode based on the command of the programmable controller 202. In a preferred embodiment, the compressor speed is adjusted to adjust the compressor output pressure. In another embodiment, the compressor displacement is adjusted to adjust the compressor output pressure. For example, if the measured product gas pressure is 20% under the pre-determined pressure range, the compressor 102 might be adjusted to operate at 100% of maximum speed, while when the pressure is 10% under the pre-determined pressure range, the compressor 102 might be adjusted to operate at 80% of maximum speed.

Thus, by characterizing the performance of the system in terms of the pressure of the product gas and adjusting the operation accordingly, the system as a whole can be tuned without necessarily requiring compressors or other components to operate within a narrow band of tolerance in order for the system to be effective. One advantage is that such a feature can widen the tolerance of compressors that can be utilized, and thus can effectively decrease the cost of the gas fractionalization system.

Various embodiments of methods for tuning the gas fractionalization system are now described. FIG. 3 shows one embodiment of a process 300 that can be configured to perform adjustment of the compressor output, such as compressor output pressure, based on the condition of the oxygen rich gas. In a process block 302, pressurized air with an output pressure is provided to a PSA unit. In a process block 304, oxygen rich gas is produced from the PSA unit, where the amount of the oxygen rich gas generally depends on the compressor output pressure. In a process block 306, a condition of the oxygen rich gas is obtained. In one embodiment, such condition includes a pressure condition associated with the oxygen rich gas. In a process block 308, the output flow of the compressor is adjusted based on the condition of the oxygen rich gas. In one embodiment, the compressor output pressure can be adjusted by adjusting the operation of the compressor. As previously described, the compressor can be adjusted so that its speed and/or its displacement is changed which adjusts its output flow.

Various parts of the process 300 of FIG. 300 can be implemented in a number of different ways. For example, FIG. 4 shows one embodiment of a process 310 configured to perform the process block 302 of FIG. 302. In a process block 312, ambient air is provided to the compressor. In a process block 314, the ambient air is pressurized by the compressor and delivered to the PSA unit.

FIGS. 5A and 5B show example processes 320 and 330 for obtaining information about the condition of the oxygen rich gas, and adjusting the compressor output accordingly. Such processes can be performed in the process blocks 306 and 308 of the process 300 of FIG. 3. As shown in FIG. 5A, the process 320 includes a process block 322 where pressure information associated with the condition of the oxygen rich gas is obtained. In one embodiment, such pressure information can be obtained via pressure information associated with a contained space where the oxygen rich gas is collected. For the purpose of description, it will be understood that "contained space" can include a vessel where gas is collected, as well as any conduits leading to and from the vessel, such that pressure in such conduits are generally similar to that of the vessel. As further shown in FIG. 5A, the process 320 can also include a process block 324 where an adjustment to the compressor output is made, based on the pressure information associated with the contained space.

As shown in FIG. 5B, the process 330 can include a process block 332 where pressure information associated with the condition of the oxygen rich gas is obtained. In one embodiment, the process block 332 can be similar to the process block 322 of the process 320 of FIG. 5A. As further shown in FIG. 5B, the process 330 can further include a process block 334 where an ambient pressure is obtained. In a process block 336, the compressor output pressure can be adjusted based on the pressure information associated with the contained space, as well as the ambient pressure.

In general, a pressure condition of a gas can be expressed in a number of different ways. For example, a single pressure measurement made at a given time can provide some indication of the condition of the gas. In some operating situations, however, such single measurements may be susceptible to fluctuations that are not necessarily due to the compressor performance or other systematic effect (such as performance degradation over time). For example, during the actual delivery of the oxygen rich gas to a patient, where the patient is actually breathing on the end of the delivery system, spurious pressure effects not related to the compressor operation (or the systematic effect) can arise. Moreover, the delivery of boluses is typically patient driven (for example, in response to a breathing pattern), as opposed to a generally regular intervals of the PSA operation.

Thus, to reduce inducing adjustment of the compressor output pressure based on such spurious pressure fluctuations, the pressure condition of the oxygen rich gas (for example, in the processes 300, 320, and 330 of FIGS. 3, 5A, and 5B) can be based on some combination of a plurality of pressure measurements. For example, an average value can be obtained for pressure measurements at different times.

Figure 6:
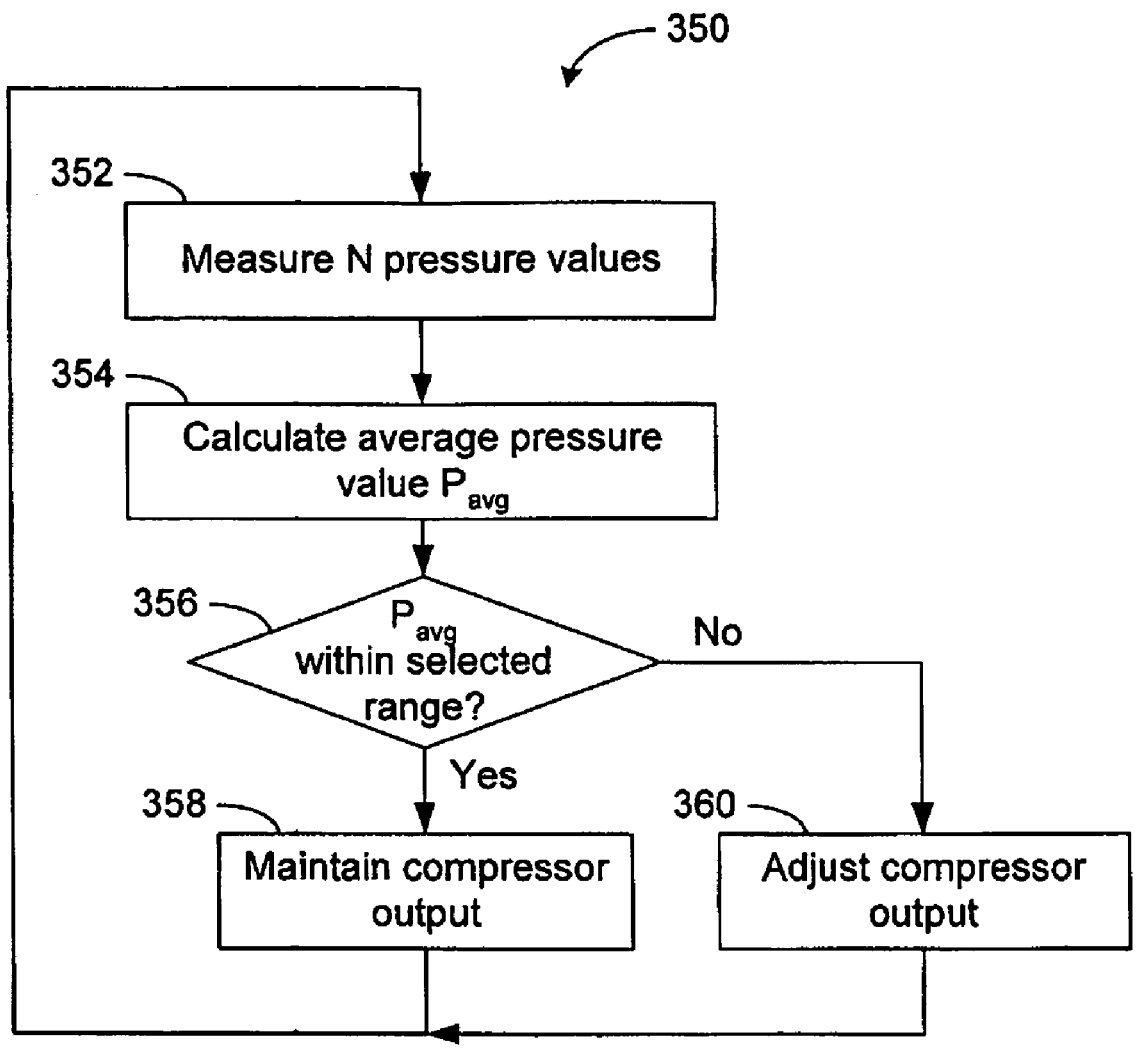
FIG. 6 shows one embodiment of a process configured to determine an average pressure value of one or more measured pressure values.

FIG. 6 shows one embodiment of a process 350 where such averaging of the pressure values can be achieved to make the adjustment process less susceptible to spurious effects. In a process block 352, pressure values are measured at "N" different times. In one embodiment, such measurements can be made for at a set of consecutive sampling times. However, it will be understood that any number of combination of sampling can be used to obtain the N measurements.

As further shown in FIG. 6, the process 350 further includes a process block 354 where an average value ($P_{avg}$) of the N pressure values is calculated. In some embodiments, the average pressure value $P_{avg}$ can represent the pressure condition associated with the contained space described above in reference to FIGS. 5A and 5A.

The process 350 in a decision block 356 determines whether the average pressure value $P_{avg}$ is within a selected range. If the answer is "Yes," the process 350 maintains the compressor operation in a process block 358. In the answer is "No," the process 350 adjusts the compressor operation in a process block 360. An example of such adjustment of the compressor operation is described below in greater detail.

The value of N can be selected from any number. In one embodiment, for example, measurements from 50 breath cycles can be used to obtain an average pressure value. In one embodiment, any change in set-up or operation, such as a flow setting adjustment or any error detected by the system can result in the measured data to be discarded so that the averaging cycle count start anew. Thus in such an embodiment, no adjustment is made to the compressor output unless data is acquired for a period of at least the set number of breaths with no operational changes or errors detected during that period. Such a feature can provide for a feedback system where adjustments to the compressor correct for relatively slow compressor and/or systematic changes that occur over long periods. While this averaging process is performed generally continuously, the rate of change may be very slow, permitting changes to the compressor operation when optimal conditions for sensing feedback parameters exist.

Figure 7:
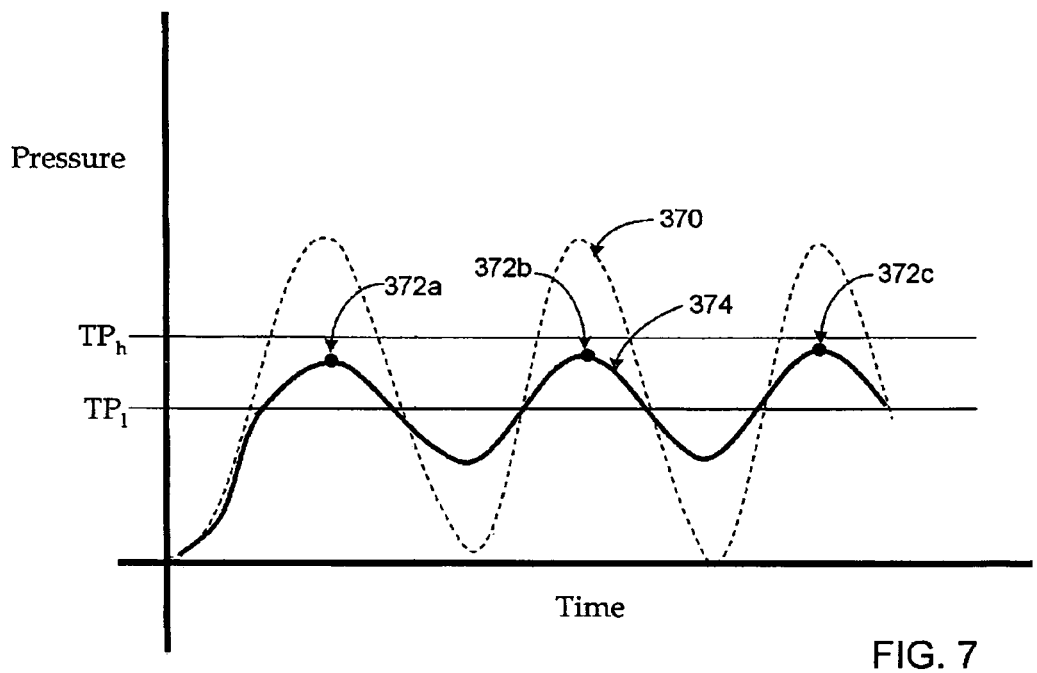
FIG. 7 shows that in one embodiment, pressure values can be measured as peak values of a pressure profile corresponding to the output of the PSA unit.

FIG. 7 shows an example of how a plurality of pressure measurements can be made at different times. In certain embodiments of the gas fractionalization system, the PSA unit operates with pressure that varies in a periodic manner (depicted as 370). The resulting oxygen rich gas typically has a pressure that also varies in a similar periodic manner (depicted as 374), but with an attenuated amplitude. For such a system, pressure values at or near the peaks of the oxygen rich gas correspond to peak pressure values of the PSA cycle, and thus can be sampled, as depicted by sample points 372a, 372b, and 372c. In one embodiment, such sampling can be achieved via a pressure sensor positioned inside the contained space that receives the oxygen rich gas.

FIG. 7 also shows that a pressure range, having lower and upper pressure boundaries $TP_l$ and $TP_h$, can be selected to allow comparison of the measured peak pressure values. As previously described, an average value of a plurality of sampled peak values 372 can be obtained and compared to the selected pressure range. As will be described in greater detail below, in certain embodiments, the selected pressure range can be obtained empirically.

Figure 8:
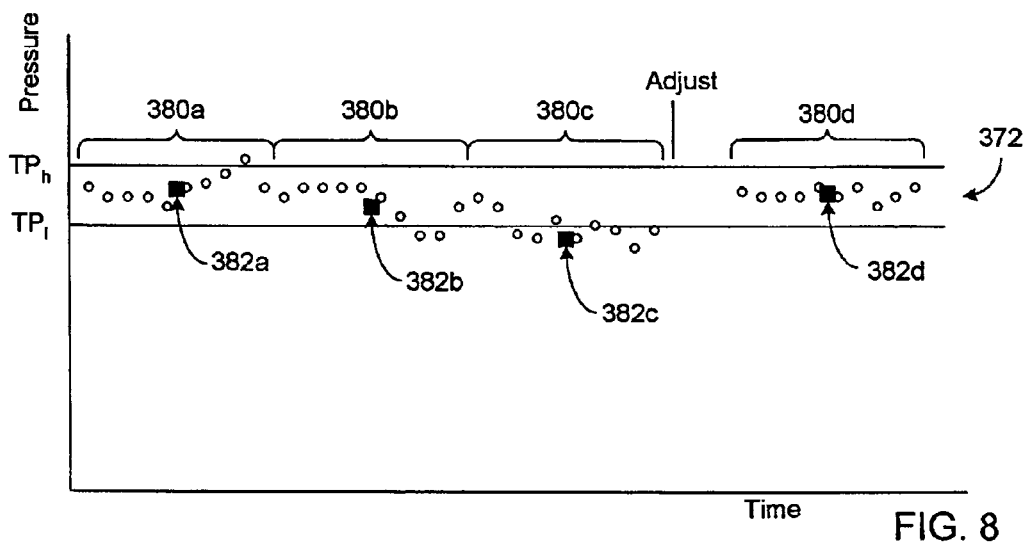
FIG. 8 shows an example of average pressure values determined from groups of measured pressure values, and how an adjustment can be made to the compressor output if an average pressure value goes outside of a selected pressure range.

FIG. 8 shows an example of how the average values of the oxygen rich gas pressure can be obtained and compared with the selected pressure range. Example peak pressure values are depicted as open circle data points 372. With progression of time, the peak pressure value is shown to fluctuate, with some values exceeding the boundaries $TP_l$ and $TP_h$ of the selected range.

FIG. 8 also shows example groupings of the peak pressure values. A first group 380a is shown to represent the first ten example peak pressure data points; a second group 380b is shown to represent the next ten data points; and so on. For the first group 380a, an average peak pressure value is depicted as a filled square data point 382a. Similarly, data point 382b represents the average of the peak pressure values of the second group 380b, and so on.

The example peak pressure averages 382a, 382b, and 382c show that the first two average values are within the selected pressure range. However, the third example average value 382c is shown to be outside of the selected range (below the lower boundary $TP_l$). As described herein, detection of such average pressure value outside of the selected range can trigger an adjustment of the compressor operation. Such adjustment can be made to bring the average pressure value back into the selected range. Thus, an adjustment is shown to be triggered after the third example group 380c that resulted in the out-of-range average pressure value 382c. A group 380d is shown to include pressure values that reflect the adjustment to the compressor operation. Accordingly, the resulting average value 382d is depicted as also being within the selected pressure range.

In one embodiment, the peak pressures in the contained space can be sampled in a known manner. The sampled signals can be digitized using an ADC (analog-to-digital converter), also in a known manner, so as to allow subsequent processing such as average value determination and if needed, adjustment of the compressor operation.

In one embodiment, a selected pressure range representative of a nominal oxygen rich gas pressure can be determined empirically for a given flow rate setting. When the gas fractionalization system is initially set up, it can be operated for a period of time (for example, several hours) at a flow rate setting (for example, at a high flow rate setting), and the peak pressure readings can be logged. Based on such logged peak pressure values, a range of actual measured values, as well as a nominal pressure value (an average of the logged pressure readings) can be determined. A window about the nominal value can be selected to represent the selected range described above in reference to FIGS. 7 and 8. For example, the window can be formed to include 2% of the full range above and below the nominal value. In another embodiment, a selected range can be chosen so that the values of $TP_l$ and $TP_h$ are fixed.

In some embodiments, as described above in reference to FIGS. 1 and 5B, the operation of the gas fractionalization system can be configured for efficient operation at different altitudes. For example, when operating at higher altitudes, a compression ratio associated with the oxygen rich gas may be a better operating parameter than the absolute oxygen rich gas pressure itself. Therefore at higher altitudes, where the ambient pressure is lower, the system's internal pressure may also be lower for a given flow rate setting.

In some embodiments, the compression ratio K can be determined as $$K=(P_{ambient}+P_{accumulator})/P_{ambient} \quad (1)$$

where $P_{ambient}$ represents an absolute ambient pressure and $P_{accumulator}$ represents the gauge pressure of the oxygen rich gas. Observations have shown that the gas fractionalization system can operate efficiently at varying altitudes as long as the compression ratio K remains generally constant.

Based on such an observation, the compression ratio can be used as an operational parameter that can be monitored in a manner similar to that described above in reference to FIGS. 7 and 8. In one embodiment, the ambient pressure and the gauge pressure of the oxygen rich gas can be represented in similar average forms. In certain situations, averaging of the ambient pressure can reduce signal noise.

Figure 9:
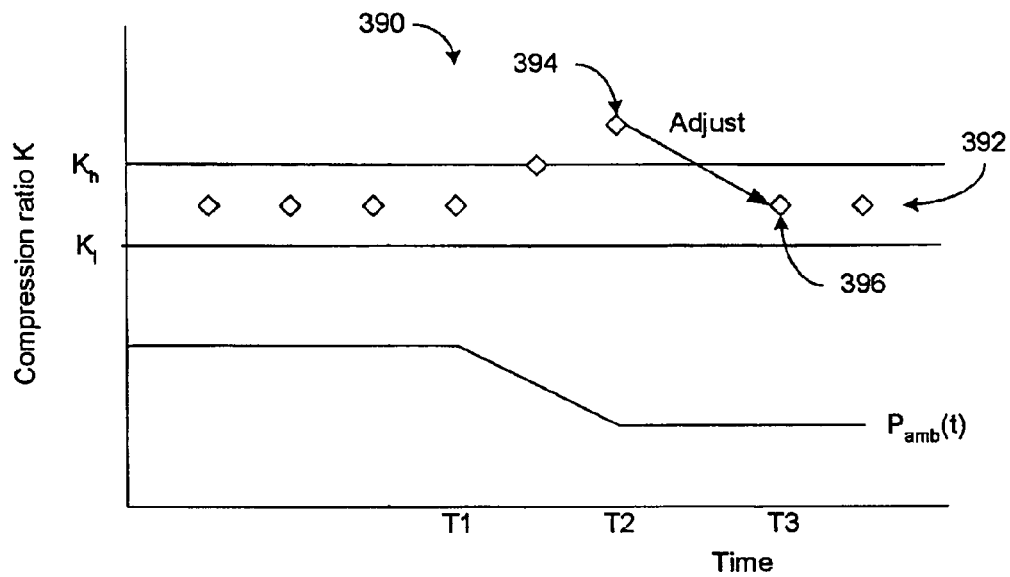
FIG. 9 shows an example of a compressor output adjustment that can be based on a change in the ambient pressure.

FIG. 9 shows an example monitoring of a compression ratio profile 390 as the ambient pressure $P_{amb}(t)$ changes as a function of time. The example ambient pressure is depicted as being at a first level prior to time T1. Between T1 and T2, the ambient pressure is shown to decrease to a second level.

The gauge pressure $P_{accumulator}$ of the product gas can be measured and represented in an average form as before. The ambient pressure $P_{ambient}$ can also be measured and represented in an average form, corresponding to the same time period as that for the gauge pressure determination. Based on Equation 1, the compression ratio can be calculated for the period where the averaging of pressure value(s) occurred. Such compression ratio values are depicted as diamond shaped data points 392. Also depicted in FIG. 9 is a selected range of the compression ratio, with the range having lower and upper boundaries $K_l$ and $K_h$.

In the example profile 390 of FIG. 9, the compression ratio values are depicted as being within the selected range until and including time T1. As the ambient pressure decreases, the compression ratio is shown to increase, until at time T2, the compression ratio value 394 is outside of the selected range. Upon such an occurrence, an adjustment to the compression operation is shown to be made between times T2 and T3, so that at T3, the compression ratio 396 is again within the selected range.

Similar to the pressure value case, the selected range for the compression ratio can be selected based on fixed boundary values, or empirical measurements.

In one embodiment, a target pressure for the oxygen rich gas can be determined based on Equation 1 based on the knowledge of the compression value. Thus, the target pressure value can be expressed as $P^*=(K-1)P_{ambient}$. The target pressure $P^*$ can be monitored in a manner similar to that described above for the peak pressure (of the enclosed space) and the compression ratio. In one embodiment, the actual pressure of the enclosed space (in one embodiment, the average value) can be compared to the nominal value of the target pressure $P^*$. In one embodiment, the compressor operation can be adjusted so that the actual pressure of the enclosed space is within approximately 1% of the nominal value of the target pressure P*.

Figure 10:
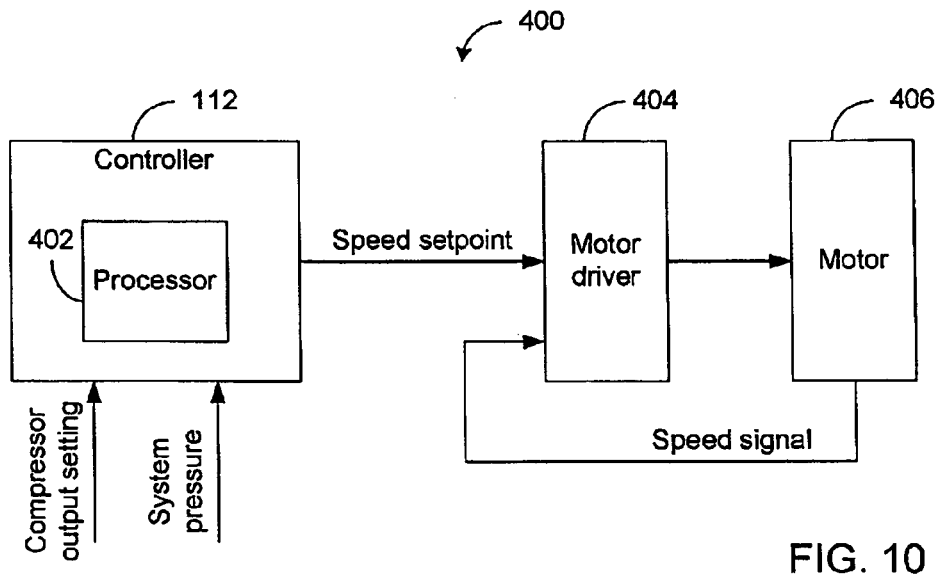
FIG. 10 shows a block diagram of a feedback control where a compressor motor operation can be adjusted based on operational parameters such as the average pressure.

FIG. 10 shows one embodiment of an example control system 400 that is configured to adjust the operation of the compressor based on the monitoring of the various pressure-related parameters associated with the oxygen rich gas. In general, feedback based control systems are well known, and any number of designs can be implemented in the example control system 400, or any other control system for controlling compressor parameters other than speed.

As shown in FIG. 10, one embodiment of the control system 400 can include the controller 112 (see FIG. 1) having a processor 402. The processor 402 can facilitate processing of input information such as the current flow rate setting and the current pressure associated with the oxygen rich gas. The processor 402 can perform the comparison of the current pressure (average value, for example) with the corresponding range, and determine whether an adjustment to the compressor operation should be made.

If an adjustment is to be made, a speed setpoint signal can be sent to a motor drive 404 that generates an appropriate signal for the operation of a motor 406. In one embodiment, a signal corresponding to the speed of the motor 406 can be provided to the motor driver 404 to effectuate reaching of the motor speed corresponding to the speed setpoint. As previously described, a change in the speed of the compressor motor can change the compressor output pressure to the PSA unit, which in turn affects the pressure of the product gas. The pressure of the product gas (in some embodiments, in conjunction with the ambient pressure) can then be monitored so as to provide an input for the feedback control system.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic may advantageously be implemented as one or more components. The components may advantageously be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

As described above, the monitoring of the condition of the "product," and adjustment of the compressor based on such monitoring, can allow for efficient operation of the gas fractionalization system. As also described above, characterizing the performance of the system based on the end product condition (for example, the pressure of the oxygen rich gas) takes into account not only the compressor performance, but also systematic effects such as a seal degradation.

Thus in some embodiments, the pressure associated with the product gas, such as an oxygen rich gas, will generally decline over time. More particularly, pressure declines that result in adjustments of the compressor operation may become more frequent as time passes. Moreover, in successive adjustments, the compressor may be forced to operate at, for example, higher speeds.

Figure 11:
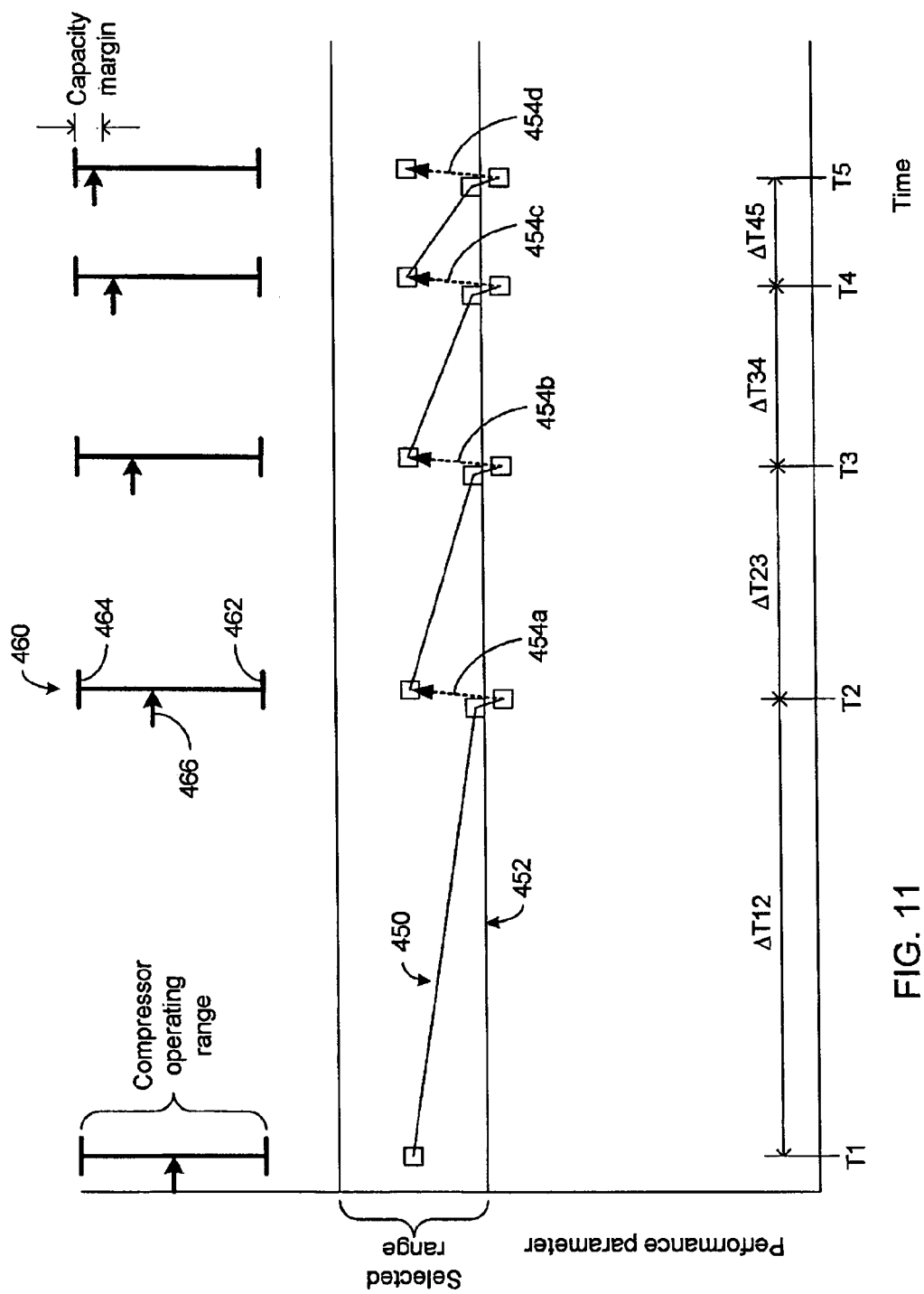
FIG. 11 shows that in one embodiment, the adjustments based on the pressure of the oxygen rich gas can be monitored to allow estimation of when the next service should be performed on the gas fractionalization apparatus.

FIG. 11 shows an example profile of a system performance parameter and the corresponding compressor adjustments. The performance parameter can be, for example, the pressure or the compression ratio described above.

At time T1 (for example, at the initial operation to establish the nominal value and the corresponding selected range 452), the performance parameter is depicted as being at or near the nominal value within the selected range. The compressor is depicted as having an operating range 460 (for example range of motor speeds) having a lower limit 462 and an upper limit 464. Such an operating range is shown for each adjustment incident, and an operating setpoint 466 (for example, motor speed setpoint) within the range 460 is also shown.

For the purpose of description, assume that at time T1, the operating setpoint is generally near the middle of the compressor operating range. As time progresses from T1, the systematic degradation of the system is depicted as a decline 450. At or about time T2, the performance parameter is shown to go below the selected range 452, and an adjustment (depicted as an arrow 454a) is shown to restore the performance parameter to or near the nominal value. Such adjustment is also shown to move the operating setpoint closer to a boundary of the operating range. For example, the compressor motor is operated at a higher speed to compensate for the systematic pressure loss.

Similar degradations and adjustments (454b, 454c, and 454d) are shown to occur at or about times T3, T4, and T5. Accordingly, the operating setpoint of the compressor is moved progressively closer to the boundary of the operating range.

In certain operating conditions, the interval between adjustments decreases as time goes on. For example, time duration $\Delta T23$ is less than $\Delta T12$; $\Delta T34$ is less than $\Delta T23$, and so on. One reason is that the systematic degradation worsens over time.

Figure 12:
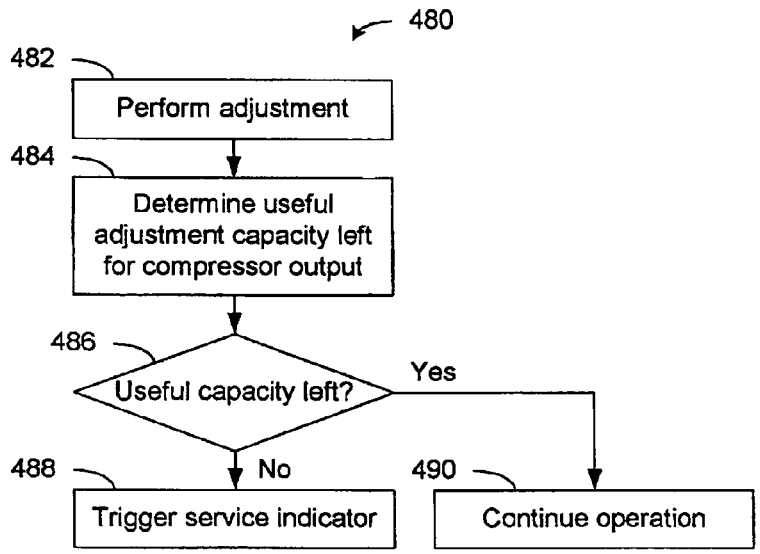
FIG. 12 shows one embodiment of an example process that can be used to trigger a service alert based on an estimation of a useful capacity left for adjustment in a component such as the compressor.
Figure 13:
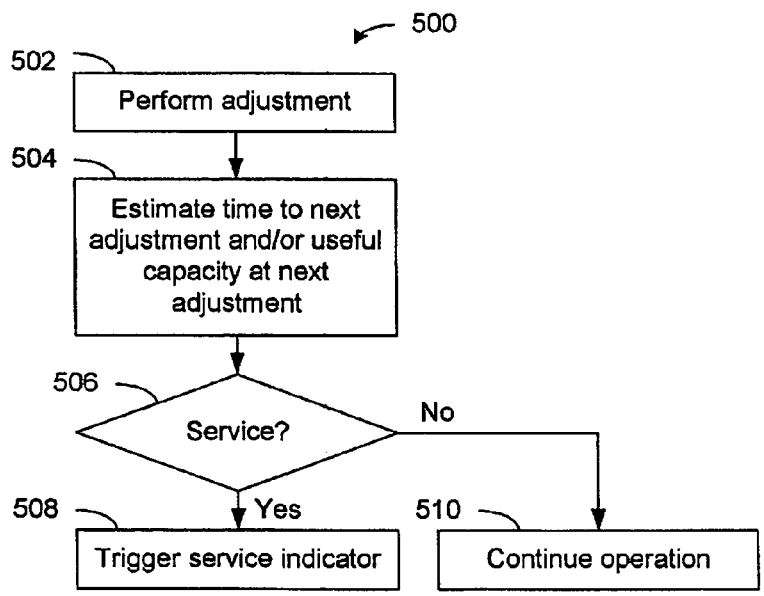
FIG. 13 shows one embodiment of another example process that can be used to trigger a service alert.

Based on the foregoing example performance degradation profile, some of which can be predicted and/or estimated, a maintenance service schedule can be estimated or triggered. FIGS. 12 and 13 show examples of such service schedule estimations.

FIG. 12 shows one embodiment of a process 480 where in a process block 482, an adjustment is made to the compressor operation. In a process block 484, a determination is made as to a useful adjustment capacity left for the compressor. In a decision block 486, the process 480 determines whether useful capacity is left so as to allow a likely change in the compressor operation at the next adjustment. If the answer is "Yes," operation of the compressor is continued until the next adjustment in a process block 490. If the answer is "No," the process 480 triggers a service indicator in a process block 488.

FIG. 13 shows one embodiment of a process 500 where in a process block 502, an adjustment is made to the compressor operation. In a process block 504, the process estimates likely time to the next adjustment and/or likely useful capacity left at the next adjustment. In a decision block 506, the process 500 determines whether a service is warranted based on either or both of the estimates in the process block 504. If the answer is "Yes," the process 500 triggers a service indicator in a process block 508. If the answer is "No," operation of the compressor is continued until the next adjustment in a process block 510.

For the example degradation-adjustment profile in FIG. 11, the operating setpoint at time T5 is depicted as being from the boundary by an amount that is less than some selected capacity margin. Thus, such a condition would result in a "No" in the decision block 486 of the example process 480 of FIG. 12, and trigger a service alert.

In another example, suppose that in FIG. 11, the time interval ΔT12 is approximately 1000 hours; ΔT23 is approximately 500 hours; ΔT34 is approximately 250 hours; and so on. Based on such a trend, a projection can be made to a time when adjustments would be required within some time duration. For example, if adjustments would likely be required within, say 24 hours, at a future time T, an appropriate service reminder can be issued at some time prior to that time T, so as to allow timely servicing of the system.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown may be made by those skilled in the art without departing from the scope of the invention. Consequently, the scope of the invention should not be limited to the foregoing description, but should be defined by the appended claims.

What is claimed is:

1. A method of producing an oxygen rich gas, comprising:
providing ambient air to a compressor;
pressuring said ambient air in the compressor;
delivering the pressurized air from the compressor to a PSA unit;
processing said pressurized air in the PSA unit in accordance with a PSA cycle so as to produce an oxygen rich gas;
measuring the pressure of the oxygen rich gas;
maintaining the pressure of the oxygen rich gas at one or more pre-selected levels by adjusting an output pressure of the compressor; and
wherein the output pressure of the compressor is adjusted based on the measured pressure of the oxygen rich gas inside a containing space, wherein measured pressure of the oxygen rich gas comprises an average of a plurality of sampled pressure values obtained during a selected time period.

2. The method of claim 1, wherein the pressure of the oxygen rich gas is generally in phase with the PSA cycle, and wherein the sampled pressure values correspond to peak values of the cyclic profile of oxygen rich gas pressure.

3. The method of claim 1, wherein the selected time period includes N sampled pressure values, such that averaging of the N values reduces the likelihood that the adjustment of the output pressure will be triggered by spurious fluctuations of individual sampled pressure values.

4. The method of claim 3, wherein the N sampled pressure values correspond to N breathing cycles.

5. The method of claim 3, wherein the selected time period begins anew when an error condition occurs during the current time period.

6. The method of claim 1, wherein the output pressure of the compressor is adjusted by adjusting a pumping speed of the compressor.

7. The method of claim 1, wherein the output of the compressor is adjusted by adjusting a displacement of the compressor.

8. The method of claim 1, wherein the output of the compressor is adjusted by a combination of adjustments to pumping speed and displacement of the compressor.

9. A method of producing an oxygen rich gas, comprising:
providing ambient air to a compressor;
pressuring said ambient air in the compressor;
delivering the pressurized air from the compressor to a PSA unit;
processing said pressurized air in the PSA unit in accordance with a PSA cycle so as to produce an oxygen rich gas;
measuring the pressure of the oxygen rich gas;
maintaining the pressure of the oxygen rich gas at one or more pre-selected levels by adjusting an output pressure of the compressor; and
measuring an ambient pressure about the substantially enclosed space so as to facilitate adjustment of the output pressure of the compressor when the ambient pressure changes.

10. The method of claim 9, wherein the output pressure of the compressor is adjusted based on a value representative of a combination of the pressure of the oxygen rich gas and the ambient pressure.

11. The method of claim 10, wherein the value comprises a compression ratio that is expressed as $K=(P_{ambient}+P_{accumulator})/P_{ambient}$, where $P_{ambient}$ represents the pressure of the oxygen rich gas and $P_{accumulator}$ represents the ambient pressure.

12. The method of claim 11, further comprising determining a target value of the oxygen rich gas, $P^*$, based on the value of the compression ratio, such that the output pressure of the compressor is adjusted to provide pressure of the oxygen rich gas at or near the target value.

13. A method of producing an oxygen rich gas, comprising:
providing ambient air to a compressor;
pressuring said ambient air in the compressor;
delivering the pressurized air from the compressor to a PSA unit;
processing said pressurized air in the PSA unit in accordance with a PSA cycle so as to produce an oxygen rich gas;
measuring the pressure of the oxygen rich gas;
maintaining the pressure of the oxygen rich gas at one or more pre-selected levels by adjusting an output pressure of the compressor; and
wherein maintaining the pressure of the oxygen rich gas at the one or more pre-selected levels comprises maintaining the pressure within a range of pressure values having a nominal value, wherein the range of pressure values is determined by measuring and logging values of the pressure of the oxygen rich gas during a selected period, so that the range includes a full range of the logged values.

14. The method of claim 13, wherein the nominal value comprises an average of the full range of the logged values.

15. The method of claim 13, wherein the range further includes upper and lower threshold values, so that a pressure value outside of such threshold values triggers the adjustment of the output pressure of the compressor.

16. The method of claim 15, wherein the upper and lower threshold values are determined by deviations from the nominal value by a fraction of the full range.

17. The method of claim 16, wherein the fraction comprises approximately two percent.

18. The method of claim 13, wherein the selected period comprises an initial period of the operation of the compressor.

19. A method of producing an oxygen rich gas, comprising:
providing ambient air to a compressor;
pressuring said ambient air in the compressor;
delivering the pressurized air from the compressor to a PSA unit;
processing said pressurized air in the PSA unit in accordance with a PSA cycle so as to produce an oxygen rich gas;

measuring the pressure of the oxygen rich gas;

maintaining the pressure of the oxygen rich gas at one or more pre-selected levels by adjusting an output pressure of the compressor;

monitoring an operating parameter of the compressor that is used for adjusting the output pressure of the compressor;

determining whether the operating parameter can be adjusted by an amount greater than a capacity margin associated with the operating parameter of the compressor; and wherein a service indicator is triggered if the amount of adjustment exceeds the capacity margin.

20. The method of claim 19, wherein the further comprising determining whether the operating parameter can be adjusted by an amount greater than a capacity margin associated with the operating parameter of the compressor.

21. The method of claim 19, wherein the operating parameter comprises a speed of a pump used in the compressor.

22. A gas fractionalization apparatus, comprising:

a compressor which compresses a gas to provide an output gas;

a PSA unit which receives and processes the output gas from the compressor to produce a product gas;

a sensing device which measures the pressure of the product gas; and a feedback mechanism which controls the pressure of the product gas by varying one or more parameters of the compressor in response to changes in the pressure of the purified gas; and a second sensing device which measures the pressure of ambient air.

23. The apparatus of claim 22, wherein the product gas comprises an oxygen rich gas.

24. The apparatus of claim 22, wherein the product gas pressure is measured by the sensing device within a storage device.

25. The apparatus of claim 22, wherein the feedback mechanism comprises a programmable controller and a pulse width modulation circuit in communication with the compressor.

26. The apparatus of claim 22, wherein the feedback mechanism adjusts the output pressure of the compressor to maintain a pre-determined compression ratio.

* * * * *

UNITED STATES PATENT AND TRADEMARK OFFICE
CERTIFICATE OF CORRECTION

PATENT NO. : 7,585,351 B2  Page 1 of 1
APPLICATION NO. : 11/362443
DATED : September 8, 2009
INVENTOR(S) : Geoffrey Deane et al.

It is certified that error appears in the above-identified patent and that said Letters Patent is hereby corrected as shown below:

At column 8, line 40, please delete "5A." and insert therefore, --5B.--.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,585,351 B2 Page 1 of 1
APPLICATION NO. : 11/362443
DATED : September 8, 2009
INVENTOR(S) : Deane et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 803 days.

Signed and Sealed this

Fourteenth Day of September, 2010

David J. Kappos
*Director of the United States Patent and Trademark Office*